May 28, 1957 K. S. HODGE 2,793,789
SOAP MEASURING DEVICE
Filed May 4, 1955 2 Sheets-Sheet 1

INVENTOR.
KENNETH S. HODGE.
BY Louis Chayka
ATTORNEY

May 28, 1957  K. S. HODGE  2,793,789
SOAP MEASURING DEVICE
Filed May 4, 1955  2 Sheets-Sheet 2

WATER

MINERAL CONTENT (GRAINS PER GALLON)

|  |  |  | UNDER 5 GRAINS | 5-12 GRAINS | OVER 12 GRAINS |
|---|---|---|---|---|---|
|  |  |  | SOFT | MEDIUM | HARD |
| WASH FABRIC CONTENT (LBS. PER WASH) | UNDER 5 LBS. | LIGHT | A | B | C |
|  | 5-8 LBS. | MEDIUM | B | C | D |
|  | OVER 8 LBS. OR EXTRA DIRTY | HEAVY | C | D | E |

INVENTOR.
KENNETH S. HODGE
BY Louis Chayka
ATTORNEY

United States Patent Office 2,793,789
Patented May 28, 1957

2,793,789

SOAP MEASURING DEVICE

Kenneth S. Hodge, Pendleton, Oreg.

Application May 4, 1955, Serial No. 505,951

3 Claims. (Cl. 222—47)

My improvement pertains to a device adapted for use with a carton type container for granulated or powdered soap, the device to serve both as a means for measuring a quantity of soap to be used in a specific washing operation and as a means of dispensing the precise quantity of the soap so measured out.

More specifically, the device is to be used as a means of measuring out a quantity of soap to be used in an automatic washing machine where consideration has to be given to the weight of the fabrics to be washed as a batch, the soil content thereof, and the hardness of the water used for washing.

A further object of the improvement is to provide a device which may be quickly and easily applied to the conventional soap carton in which soap is sold to the public, and which, when so applied, will serve as a chamber of an adjustable capacity into which soap from the carton may be delivered before it is to be poured out into the washing machine.

I shall now describe my device with reference to the accompanying drawings in which.

Similar numerals refer to similar parts throughout the several views.

Figure 1:
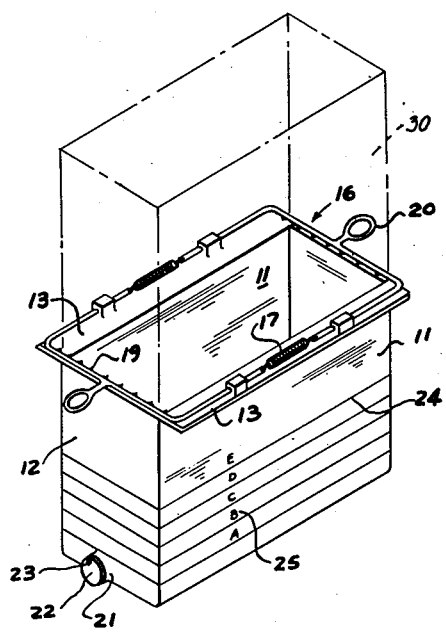
Fig. 1 is a perspective view of my device in its soap-measuring position, the view including the contour, in dotted lines, of a conventional soap carton to which the device is applied.
Figure 2:
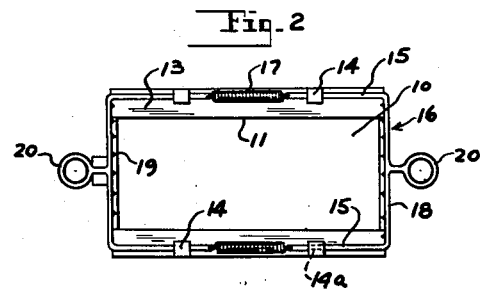
Fig. 2 is a top elevational view of the device when in its soap-receiving position.

The device comprises a rectangular container or cup which includes a bottom wall 10, two side walls 11, and two transversely-disposed end walls 12, while the top of the container is open. As it is essential that at certain times the contents of the container be kept in view, the container is made of transparent substance, preferably of light plastic material. The length and width of the container are such as to correspond to the dimensions of the commercially available soap cartons, or, more accurately, to the dimensions of the cartons to which the device is to be applied.

Projecting laterally from the top of each side wall, all along its length, is a horizontally-disposed flange 13, and rising from the upper surface from each flange are two blocks 14 disposed in a spaced relation to each other. Each of the blocks is provided with a horizontal bore 14a in the direction of the flange. For the purpose of this description, a block on one flange and a laterally-alined block on the opposite flange will constitute a pair.

Slidingly disposed in the bores of each pair are two parallel legs 15 of a U-shaped member or fork generally marked 16, the forks being in opposed relation to each other and in such relation that the ends of the legs of one fork are joined to the legs of the other fork by means of a coiled spring 17. It will be noted that the legs of each fork are joined by a transversely-disposed member 18 which on the side facing the interior of the container is provided with a plurality of teeth or serrations 19. A wire eyelet 20, applied to said transverse member and extending outwardly away from the end wall of the container, serves as a handle for the operation of the fork against the tension of the spring 17.

Figure 3:
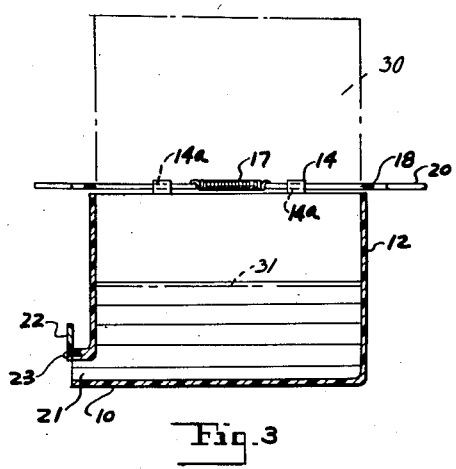
Fig. 3 is a side elevational view of the device.

At the lower portion of one end wall the container is provided with a spout 21 and a cover 22 for the same, the cover being pivotally mounted upon the end of the spout, by means of a pin 23, as shown in Fig. 3.

At least one end wall, but preferably one side wall, of the container bears upon it a plurality of parallel lines 24 equally spaced from each other, the individual lines being identified by letters or numerals or other suitable legends, as shown at 25. The lines serve as calibrations for determination of the quantity of soap which is to be poured into the container from the carton to which the container is applied.

As already stated, the device is to be used in conjunction with a commercially available carton marked 30. It will be assumed that the carton with the soap has, in its top wall, a suitable opening of a restricted dimension, by means of which opening the soap is to be poured out. Before applying the device to the carton, it has to be decided what quantity of soap is to be used for a specific washing operation, considering the weight of the fabric in the batch to be washed, its soil content, and the hardness of the water to be used for that purpose.

Figures 5, 6:
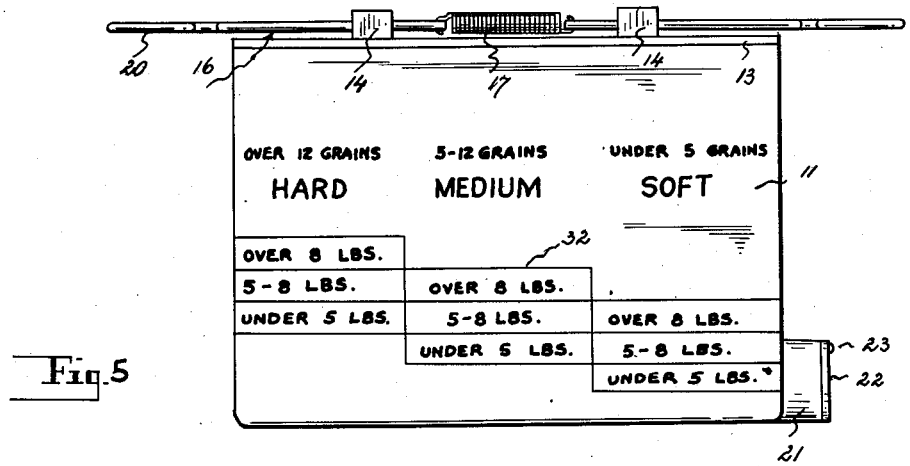
Fig. 5 is an enlarged side elevational view of my device, the view including a chart displayed thereon to indicate the quantity of soap to be used for a specific job.
Fig. 6 shows another chart also suitable for the same purpose.

The quantity will be indicated by a chart which may be directly displayed on the container or which may be separate therefrom. A chart of this type is shown in Fig. 5 in which reference is had to the hardness of water, described in grains of mineral content and classified as hard, medium, and soft, and to the weight of the fabrics to be washed. The quantity of soap needed for a specific job is indicated by a respective horizontal line, such as line 32 which indicates the level to which the container is to be filled with soap from a carton.

Another type of a chart is shown in Fig. 6 where reference is also had to the hardness of water and to the weight of a wash, but in which the respective quantity of soap is indicated by a letter of the alphabet, such as the letter "A." The letter refers to a line marked "A" on the container, and indicates the level to which the container is to be filled with soap from said carton. Thus, for instance, if the weight of the batch is under five pounds and the mineral content of the water is such that the water is considered soft, and the soil content is low, the key to the quantity of soap to be used will be letter "A," which letter identifies one of the calibrations above described.

It will be understood that such charts are only suggestive and that other charts for the purpose may be devised.

Figure 4:
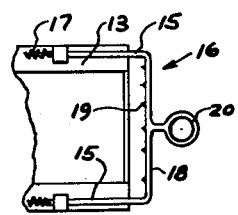
Fig. 4 is a fragmentary top elevational view of the device, the view disclosing an element at one stage of its operative use.

This matter, as to the proper calibration, having been decided, the container may be applied telescopically over the top of the soap carton and pushed down till the line marked "A" will be at the level of the top wall of the carton. To facilitate the application of the device to the top of the carton, the forks 16 will have to be partly withdrawn outwardly, as shown in Fig. 4, to prevent the serrations 19 from tearing the wall of the carton, but will be released when the device has been lowered to the desired calibration. When released, the forks will grip the end walls of the carton by means of said teeth and hold the device in place.

If now the carton with the container will be inverted, as shown in Figs. 1 and 3, the space between the top of the carton 31 and the wall 10 of the container will serve as a chamber into which the soap from the carton may be shaken. During that time the spout 21 has to be closed by its cover 22. Once the chamber has been filled with soap, the cover 22 may be disengaged from the opening of the spout, and the soap within the chamber may be poured off through said spout into the drum of the washing machine.

As for the container, it may be left on the carton for use till all the soap therefrom has been exhausted, whereupon it may be transferred to another carton.

I claim:

1. In a soap-measuring device for application to a soap-containing carton having a top wall provided with an outlet, the device comprising a container having a flat bottom, two vertical side walls, and two end walls, but being open at the top and being provided with an outlet in one wall at a level adjoining the bottom, said container being adapted, in its inverted position, to be applied telescopically to the upper portion of the carton and to be adjusted vertically thereon, a U-shaped member at each end of the container at the top thereof, the member including two legs one of which is disposed along one side of the container outside thereof, while the other leg is similarly disposed along the other side of the container, and a serrated cross bar facing a similar bar of the other U-shaped member, the legs of each member being mounted on the container for a longitudinally sliding movement, and spring means urging each bar into engagement with the respective wall of the carton, the container being provided with a plurality of calibrations on a wall thereof to serve as guiding means for the vertical adjustment of said container.

2. In a soap-measuring device for application to a soap-containing carton having a top wall provided with an outlet, the device comprising an open-top container having a flat bottom, two vertically-disposed side walls, and two end walls, at least one wall being provided with a plurality of calibrations to indicate capacity of the container at respective levels, and with a spout in a bottom adjoining position, a lateral flange extending outwardly from each side wall, a U-shaped fork at each end of the container, the fork including two parallel legs and a serrated cross-bar extending above the end wall and normally aligned therewith, means to keep the legs of the forks in a longitudinally-sliding relation to said flanges, and spring means connected to said U-shaped members to cause the serrated bars to engage the respective walls of the carton.

3. In a soap-measuring device for application to a soap-containing carton having a top wall provided with an outlet, the device comprising an open-top container having internal dimensions corresponding to those of the carton and adapted to be applied to the carton telescopically over the top portion thereof, two U-shaped members disposed horizontally at a level above the top of the container and mounted on the container for a sliding movement thereon, each U-shaped member including a cross-member provided with serrations for engagement with the carton, and spring means urging the U-shaped members to grip the carton from opposite sides by means of said cross-members, the container being adapted to be adjusted vertically with respect to said carton and being provided with a plurality of lines serving as calibrations for guidance in vertical adjustment of said container and with an outlet for discharge of soap therefrom.

References Cited in the file of this patent

UNITED STATES PATENTS

| | | |
|---|---|---|
| 744,129 | Thomas | Nov. 17, 1903 |
| 1,996,856 | Crane | Apr. 9, 1935 |
| 2,372,278 | Jess | Mar. 27, 1945 |
| 2,393,454 | Bailey | Jan. 22, 1946 |